United States Patent Office 2,998,301
Patented Aug. 29, 1961

2,998,301
PROCESS FOR PREPARING DIVANADIUM DODECACARBONYL
John E. Wyman, Topsfield, Mass., assignor to Union Carbide Corporation, a corporation of New York
No Drawing. Filed Oct. 16, 1959, Ser. No. 846,774
7 Claims. (Cl. 23—203)

This invention relates to a method for preparing divanadium dodecacarbonyl. More particularly, the invention relates to a process for preparing this metal carbonyl by the reaction of a bis(aromatic hydrocarbon)vanadium compound with carbon monoxide.

Divanadium dodecacarbonyl is a blue, crystalline compound which is useful as a metal plating agent and, in conjunction with trialkyl aluminum compounds, as a catalyst for olefin polymerization. We have now discovered that this useful metal carbonyl may be prepared by reacting a bis(aromatic hydrocarbon)vanadium compound with carbon monoxide. The process of this invention may be represented by the equation

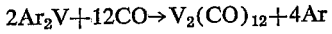

$$2Ar_2V + 12CO \rightarrow V_2(CO)_{12} + 4Ar$$

wherein Ar represents an aromatic hydrocarbon group. Any bis(aromatic hydrocarbon)vanadium compound may be used. However, preferred reactants are bis(benzene)-vanadium; bis(alkyl-substituted benzene)vanadium compounds, such as bis(toluene)vanadium, bis(cumene)-vanadium, bis(mesitylene)vanadium and bis(hexamethylbenzene)vanadium; bis(alkylene-substituted benzene)-vanadium compounds, such as bis(tetra-hydronaphthalene)vanadium; bis(aryl-substituted benzene)vanadium compounds, such as bis(diphenyl)vanadium; and bis(alkaryl-substituted benzene)vanadium compounds, such as bis(p-ethyl diphenyl)vanadium and bis(p-p'-dimethyl-diphenyl)vanadium.

The bis(aromatic hydrocarbon)vanadium compounds may be prepared by heating a mixture of a vanadium halide, the aromatic hydrocarbon, anhydrous aluminum halide and aluminum powder. This process is described in detail in articles by E. O. Fischer and coworkers, for example, Angew. Chem. 69, 207 (1957), and Ber. 90, 250 (1957).

According to the process of this invention a bis(aromatic hydrocarbon)vanadium compound is contacted with carbon monoxide at a pressure of at least 15 pounds per square inch gauge (p.s.i.g.) and at a temperature between about 55° C. and 120° C. and there results, or is produced, divanadium dodecacarbonyl. The entire reaction is preferably carried out in the absence of air and moisture, which may be conveniently excluded by employing dry, oxygen-free carbon monoxide.

It is also preferable to employ an inert liquid organic solvent for the bis(aromatic hydrocarbon)vanadium compound. Aromatic hydrocarbon solvents are preferred, but other inert liquid organic solvents such as heptane, petroleum ether, diethyl ether, ethylene glycol dimethyl ether and cyclohexane may be used. The solvents most preferred are benzene and lower alkyl-substituted benzenes such as toluene, xylene, mesitylene, cumene and ethylbenzene.

Carbon monoxide pressures above about 15 p.s.i.g. are operable, but pressures in the range of about 500 p.s.i.g. to about 900 p.s.i.g. are preferred. Higher pressure may be employed, if desired. Because of the superatmospheric pressures involved, the reaction is conveniently carried out in a suitable pressure vessel such as an autoclave. The carbon monoxide may be diluted with another gas, such as hydrogen, if desired.

Reaction temperatures may vary over the range from about 55° C. to about 120° C. and the preferred temperature range is about 70° C. to about 80° C. At temperatures below about 55° C. the yield of $V_2(CO)_{12}$ decreases rapidly while increasing quantities of a side product, namely di(aromatic hydrocarbon)divanadium hexacarbonyl are produced. At temperatures in the 70° C. to 80° C. range, good yields of substantially pure divanadium dodecacarbonyl are obtained.

The reactants should be maintained under the reaction conditons for at least 15 minutes. It is not detrimental to maintain reaction conditions for long periods of time and reaction times of up to 8 hours have been used. In the preferred temperature range of about 70° C. to 80° C., a reaction time of about three hours is preferable.

The divanadium dodecacarbonyl may be recovered from the final reaction mixture by conventional procedures. For example, the product and the solvent in which the product is dissolved may be separated from any solid residue present in the reaction mixture by distillation under reduced pressure, and the divanadium dodecacarbonyl may then be recovered from the solution by evaporation of the solvent or by crystallization from the solution at low temperatures. If desired, the divanadium dodecacarbonyl may be further purified by sublimation.

Example 1

Bis(toluene)vanadium, 9.4 grams, was dissolved in 200 milliliters of dry, oxygen-free toluene. Air was excluded by means of an inert gas atmosphere. The solution was placed in a pressure vessel containing a few stainless steel balls and the vessel was sealed. After pressurizing with 150 pounds per square inch gauge (p.s.i.g.) hydrogen and 850 p.s.i.g. carbon monoxide, the vessel was rocked and heated to a maximum temperature of 79° C. during a period of three hours.

After cooling, the vessel was opened and the solution of $V_2(CO)_{12}$ in toluene was decanted from a solid residue. The toluene solution was distilled, at reduced pressure, from a vessel at about 40° C. to a cold trap maintained at —80° C., the crude $V_2(CO)_{12}$ product accompanying the toluene into the cold trap where the carbonyl crystallized out of solution and was recovered by filtration at —80° C. The $V_2(CO)_{12}$ was purified by sublimation, at atmospheric pressure, from a surface warmed to about 40° C. to a cold finger at 0° C. The yield of divanadium dodecacarbonyl was 0.95 gram or 11 percent based on bis(toluene)vanadium.

Example 2

Divanadium dodecacarbonyl is prepared according to the procedure described in detail in Example 1 except that pure carbon monoxide at about 850 p.s.i.g. is employed rather than carbon monoxide diluted with hydrogen.

Example 3

Divanadium dodecacarbonyl is prepared according to the procedure of Example 1 except that bis(benzene)-vanadium is employed as the bis(aromatic hydrocarbon)-vanadium compound and benzene is employed as the solvent.

Example 4

Divanadium dodecacarbonyl is prepared according to the procedure of Example 1 except that bis(cumene)-vanadium is employed as the bis(aromatic hydrocarbon)-vanadium compound, cumene is employed as the solvent, and the vessel is pressurized with pure carbon monoxide to about 800 p.s.i.g.

Illustrative of the useful properties of the compound produced by the process of this invention, divanadium dodecacarbonyl (150 milligrams) was dissolved in 10 milliliters of toluene to give a yellow solution. This solution was added to 250 milliliters of toluene containing 0.4 milliliters of tri-isobutyl aluminum. The resulting mixture was placed in a 500 milliliter dasher-type autoclave and pressurized with 400 p.s.i.g. ethylene gas. The stirred mixture was heated at 40° C. for 28 minutes. After cooling the vessel and venting the excess ethylene, a fibrous polymer of ethylene remained in the toluene. Tri-isobutyl aluminum does not catalyze the polymerization of ethylene in the absence of divanadium dodecacarbonyl.

What is claimed is:

1. A process for preparing divanadium dodecacarbonyl which comprises contacting at a temperature between about 55° C. and about 120° C. a bis(aromatic hydrocarbon)vanadium compound with carbon monoxide at a pressure above about 15 pounds per square inch gauge.

2. A process for preparing divanadium dodecacarbonyl which comprises contacting in an inert liquid organic solvent and at a temperature between about 55° C. and about 120° C. (1) a bis(aromatic hydrocarbon)-vanadium compound selected from the group consisting of bis(benzene)vanadium, bis(alkyl-substituted benzene)vanadium compounds, bis(alkylene-substituted benzene)vanadium compounds, bis(aryl-substituted benzene)-vanadium compounds and bis(alkaryl-substituted benzene)vanadium compounds and (2) carbon monoxide at a pressure above about 15 pounds per square inch gauge.

3. Process in accordance with claim 2 wherein said solvent is selected from the group consisting of benzene and lower alkyl-substituted benzenes.

4. Process in accordance with claim 2 wherein said temperature is between about 70° C. and about 80° C.

5. Process in accordance with claim 2 wherein said carbon monoxide pressure is between about 500 pounds per square inch gauge and about 900 pounds per square inch gauge.

6. Process in accordance with claim 2 wherein said carbon monoxide is diluted with hydrogen.

7. A process for preparing divanadium dodecacarbonyl which comprises contacting in toluene solvent and at a temperature between about 70° C. and about 80° C. bis(toluene)-vanadium and carbon monoxide at a pressure between about 500 pounds per square inch gauge and about 900 pounds per square inch gauge.

References Cited in the file of this patent

UNITED STATES PATENTS 2,880,066     Closson et al.  ----------  Mar. 31, 1959